US005770252A

United States Patent [19]
McEwen et al.

[11] Patent Number: 5,770,252
[45] Date of Patent: Jun. 23, 1998

[54] PROCESS FOR PREPARING A BREADED FOOD

[75] Inventors: Laurel McEwen, Barrington, N.H.; Michael G. Yurchesyn, Alpharetta, Ga.; Krystyne Wypior, Nova Scotia, Canada

[73] Assignee: National Sea Products, Inc., Greenland, N.H.

[21] Appl. No.: 226,415

[22] Filed: Apr. 12, 1994

Related U.S. Application Data

[63] Continuation of Ser. No. 778,464, Oct. 16, 1991, abandoned.

[51] Int. Cl.[6] ............................. A23L 1/01; A21D 10/04; A23B 4/10
[52] U.S. Cl. ............................. 426/292; 426/94; 426/96; 426/102; 426/289; 426/302; 426/303; 426/304; 426/305
[58] Field of Search ............................. 426/94, 96, 102, 426/292, 289, 302, 303, 304, 305

[56] References Cited

U.S. PATENT DOCUMENTS

| 3,830,941 | 8/1974 | Leuft | 426/94 |
|---|---|---|---|
| 3,956,515 | 5/1976 | Moore | 426/302 |
| 4,199,603 | 4/1980 | Sortwell, III . | |
| 4,208,442 | 6/1980 | Evans | 426/94 |
| 4,260,637 | 4/1981 | Rispoli | 426/96 |
| 4,272,553 | 6/1981 | Bengtsson | 426/102 |
| 4,293,572 | 10/1981 | Silva | 426/307 |
| 4,511,583 | 4/1985 | Olson | 426/102 |
| 4,518,620 | 5/1985 | Monagle et al. . | |
| 4,529,607 | 7/1985 | Lenchin | 426/94 |
| 4,640,837 | 2/1987 | Coleman | 426/94 |
| 4,744,994 | 5/1988 | Bernacchi | 426/303 |
| 4,764,386 | 8/1988 | Bernacchi | 426/303 |
| 4,767,637 | 8/1988 | Ek | 426/94 |
| 4,778,684 | 10/1988 | D'Amico | 426/291 |
| 4,808,423 | 2/1989 | Hansson | 426/295 |
| 4,842,874 | 6/1989 | D'Amico | 426/94 |
| 4,877,628 | 10/1989 | Stypula | 426/102 |
| 4,877,629 | 10/1989 | Stypula | 426/102 |
| 4,900,573 | 2/1990 | Meyers | 426/302 |
| 4,917,912 | 4/1990 | Duncan | 426/303 |
| 4,943,438 | 7/1990 | Rosenthal | 426/303 |
| 5,171,605 | 12/1992 | Attenburrow | 426/94 |
| 5,194,271 | 3/1993 | Yasosky | 426/94 |

FOREIGN PATENT DOCUMENTS 30-66448  6/1978  Japan .

OTHER PUBLICATIONS

National Starch and Chemical Corp., "Bulletin No. 247".

*Primary Examiner*—Carolyn Paden
*Attorney, Agent, or Firm*—Fish & Richardson P.C.

[57] ABSTRACT

A breaded food product having a piece of core food (e.g., fish, poultry, or vegetable) in an uncooked state, and a breaded coating system on the core food, the coating system comprising bread crumbs and fat, the product having at least 3% and no more than 8% by weight of fat (preferably less than 6%, most preferably less than 5.5%). A breaded food product is made by applying breading on an uncooked core food, and a starch overcoat film on the breading.

7 Claims, 1 Drawing Sheet

PROCESS FOR PREPARING A BREADED FOOD

This is a continuation of application Ser. No. 07/778,464, filed Oct. 16, 1991, now abandoned.

BACKGROUND OF THE INVENTION

This invention relates to commercially prepared breaded foods.

Breaded foods enjoy wide consumer appeal because of their color and crisp appearance, and their crisp, crunchy texture when eaten. However, because breaded foods (including both food service and retail) are typically deep fried in fat, they recently have been seen as unhealthy.

Commercial breaded foods are usually distributed in a frozen state. In the so-called "raw-breaded" method of preparation, pieces of the core food, such as fish, are breaded and frozen in the raw state. Before serving, raw-breaded foods are deep fried in fat; and some of the fat becomes incorporated into the food.

By contrast, in the so-called "prefried breaded" method of preparation, the food is deep fried before freezing. Prefried breaded foods are simply heated in a conventional oven before serving.

In a third production method, the food is not deep-fried. Rather it is covered with an oil-based coating, breaded, and then frozen in the raw state. For serving, the food is oven heated. The heat raises the temperature of the oil-based coating, causing it to cook the breading. The resulting product is said to have the taste and appearance of a deep fried product. See, e.g., Monagle, U.S. Pat. 4,518,620, which describes coating a core food with a fat-emulsion batter, breading, and an egg white overcoat.

SUMMARY OF THE INVENTION

The invention achieves a breaded food product which is low in fat and saturated fat, does not require deep frying, and is tasty.

In general, in one aspect, the invention features a breaded food product having a piece of core food (e.g., fish, poultry, or vegetable) in an uncooked state, and a breaded coating system on the core food, the coating system comprising bread crumbs and fat, the product having at least 3% and no more than 8% by weight of fat (preferably less than 6%, most preferably less than 5.5%).

Preferred embodiments of the invention include the following features. The breaded coating system includes a precoating (comprising starch and flour), a batter (comprising a fat emulsion of low saturated fat oil—e.g., canola oil—in an aqueous phase), breading, and a starch overcoat. The oil may be canola oil.

In general, in another aspect, the invention features a method for making a breaded food product in which breading is applied on an uncooked core food, and a starch overcoat film is sprayed on the breading.

Preferred embodiments of the invention include the following features. Before applying the breading, a fat-emulsion coating is applied in amounts such that the finished product comprises less than 30% of calories in fat and less than 1% of its fat in the form of saturated fat. The fat-emulsion batter is prepared from a low fat oil, an emulsifier, and a stabilizer. The viscosity of the fat-emulsion batter is controlled to effect a desired pickup of breading on the batter in order to achieve a predetermined aggregate fat percentage in the finished product. Before applying the fat-emulsion coating, an undercoating of flour, starch and water is applied to the core food.

The health-oriented breaded food of the invention provides an alternative to traditional breaded food, does not require deep frying, is low in fat and in saturated fat, is tasty, and has other qualities needed to achieve wide consumer acceptance. The coating system behaves like deep-fry coating systems in terms of adhesion of the breading to the core food, uniform coverage, appearance of crispness, and ability to withstand the rigors of high volume production, i.e., freezing, packaging, storage, transportation, and handling. When oven-baked, the foods are crisp and crunchy rather than soggy and doughy, but are low in fat and less greasy than breaded foods that are deep fried. Controlling the viscosity of the fat emulsion batter assures that the desired low percentage of fat in the finished product can be achieved consistently.

Other advantages and features will become apparent from the following description, and from the claims.

DESCRIPTION

We first briefly describe the drawings.

CUTTING

Figure 1:
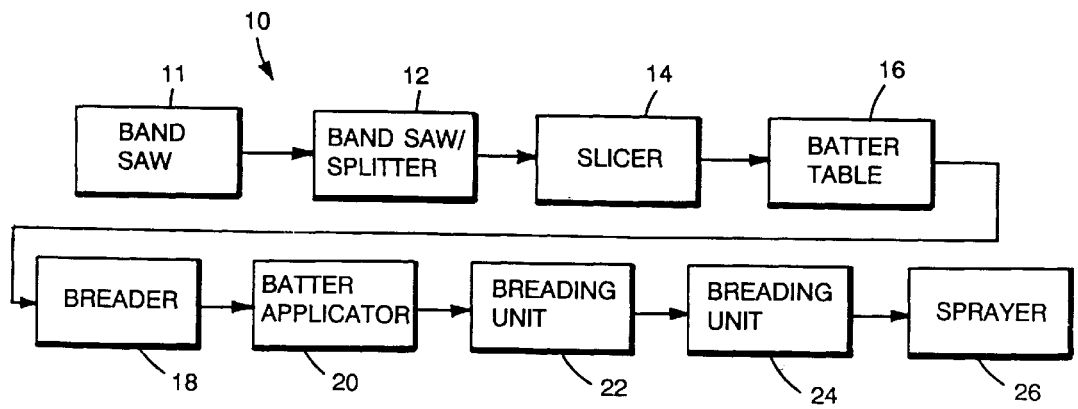
FIG. 1 is a block diagram of a processing line for preparing breaded fish foods.
Figure 2:
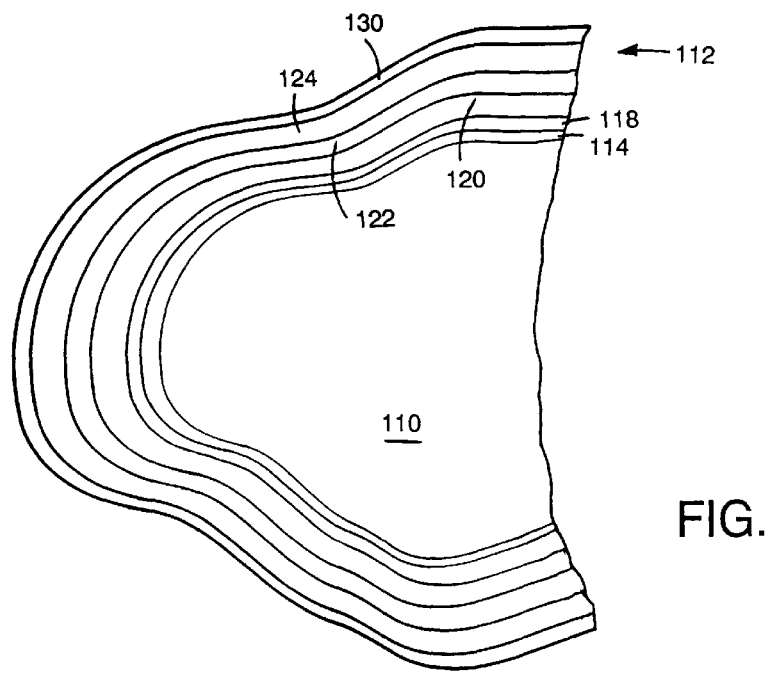
FIG. 2 is a schematic, cross-sectional view, enlarged, of a fragment of breaded food.

Referring to FIGS. 1 and 2 (reference numerals lower than 100 refer to FIG. 1, those above 100 to FIG. 2), in a breaded food processing line 10, uncooked white fish with a fat content of less than 1.5%, such as cod, deep-skinned Alaskan pollock or haddock, 110 is cut into pieces (suitable, e.g., for fish sticks or fish fillets) using two band saws 11, 12, and a slicer 14. The pieces serve as the core food 110 and are covered with a multiple layer breaded coating system 112. The fish comprises 40%–65% (preferably 54%) by weight of the finished product in the case of a fillet, and 40%–65% (preferably 51.5%) in the case of a stick.

The first stage of the coating system is a precoating that includes a two-stage process: prewash followed by predust.

Prewash

The prewash component 114 of the precoating comprises from 5% to 10% (preferably 6.5%) by weight of the finished breaded fish stick or fillet. The prewash is an aqueous phase mixture, high in starch, comprising 40% to 60% (preferably 53.6%) water, 25% to 40% (preferably 35.7%) of a mixture of flour, corn flour, and starch (Newly Weds #2872), and 6% to 25% (preferably 10.7%) of National Starch Batter Bind. The prewash can be prepared in any suitable mixing device, for example a Wilevco Mixer. A Zahn cup can be used to monitor the viscosity of the prewash mixture.

The prewash is applied using a commercial batter table 16 (e.g., a Stein). The batter table has a single curtain and is modified with upper and lower air knives and a scraper bar to insure an even application of prewash. This assures that enough solids from the prewash remain on the uncooked food to bind any excess water in the core food and prevent seepage of moisture from the core food during preparation and cooking.

Predust

The prewash covered Pollock, while still wet, is coated with a predust 118 comprising 4% to 7% (preferably 5%) by weight of the finished breaded fish stick or fillet. The predust comprises a fine crumb breading (such as Newly Weds

6162), which serves as a further moisture barrier to prevent water from being drawn out of the core food.

The predust is applied using a commercial breader 18 (for example, a Stein L5 Breader) that includes two blowers for even application.

The prewash/predust coating should be thoroughly dried before the fat-emulsion batter 120 is applied (see below) to ensure that the precoatings are not scraped off during application of the fat-emulsion batter. A long transfer belt is provided for this purpose.

The two-stage precoating reduces the amount of water which can leak from the core food during the batter coating, breading, and freezing processes, and especially during the cooking process. This helps to prevent the breading from becoming soggy and crumbling or peeling away from the core food. Given the relatively low percentage of fat in the coating system, the precoating also helps to prevent the finished product from sticking to the cooking pan as a result of fish proteins being drawn to the surface by escaping moisture.

Fat-Emulsion Batter

Next, the precoated fish pieces are covered with a fat-emulsion batter 120 (fat, caramel color, an emulsifier, and an emulsion stabilizer dissolved in an aqueous phase) that will comprise from 13% to 30% (preferably 21.5%) by weight of the finished breaded fish stick or fillet.

THE FAT

The fat is canola oil, but any edible low saturated fat oil which is liquid at room temperature can be used, e.g., soybean, safflower, or peanut oil. The liquid fat is from 20–40% (preferably about 25%) by weight of the fat-emulsion batter. The fat content of the finished food product is directly related to the percentage of fat in the fat-emulsion batter and the amount of batter used in the coating process. When the canola oil is 25% of the batter, and the batter is 21.5% of the finished product, the oil comprises only 5.38% of the finished food product, yielding a low fat, healthy product having less than the 30% of its calories in fat and less than 1% of its fat as saturated fat. The amount of fat may be adjusted to achieve both the low fat percentage desired and a proper mouth feel. In general the amount of fat is at least 3% and no more than 8% (preferably no more than 6%, most preferably no more than 5.5% by weight of fat.

THE EMULSIFIER

The emulsifier in the batter is dried egg white solids (Cutter #4000) in an amount which is about 1.5 to 4.0% (preferably 3.0%) by weight of the fat-emulsion batter. Not only do the egg whites serve to emulsify and stabilize the fat-emulsion, they solidify when the breaded food is baked, binding the oil and water, and thus, adding to the integrity and adhesion of the breading.

THE STABILIZER

The stabilizer is a water soluble gum, preferably Xanthum gum, in an amount which is about 0.3–0.5% (preferably 0.4%) by weight of the fat-emulsion batter. Both the emulsifier and stabilizer can be used to control the viscosity of the batter. Controlling the viscosity of the batter is one important mechanism for regulating the fat content of the finished food product. Fat percentage in the finished product varies with the amount of batter and the amount of breading applied (more batter means higher fat content; more breading means a lower percentage of fat content). The amount of emulsion batter that adheres during the coating process and the amount of breading that adheres to the batter during breading depend upon the viscosity of the batter. Thus, the batter viscosity can be optimized to maintain the desired level of adhesion, and hence, fat content. The emulsion batter contains 0.3%–0.5% (preferably 0.4%) stabilizer by weight for a viscosity that results in a coating of emulsion batter which comprises only about 18% to 25% (preferably 21.5%) by weight of the finished food product.

PREPARATION

The fat-emulsion batter can be prepared in any suitable mixing device (e.g., a Stephan Vertical Cutter Mixer operating at 1200 RPM) which disperses the liquid fat in the aqueous medium as fine globules or droplets. First, the emulsifier, stabilizer, and caramel color are mixed (for about 1.5 minutes) with the water, which comprises from 55% to 75% (preferably 71.525%) by weight of the fat-emulsion batter, to form an aqueous solution. The fat-emulsion batter is made by vigorously mixing or combining the fat with the aqueous solution, for about 45 seconds, and then pumping the batter through a diaphragm pump to the applicator 20.

APPLICATION

The fat-emulsion batter has good stability for recirculation in a commercial batter applicator fitted with a diaphram pump for recirculation of the emulsion batter to maintain the desired viscosity. (As the belt on the batter table moves it whips air into the emulsion causing it to thicken; if the viscosity of the emulsion rises, the pickup of emulsion will rise, thus increasing the amount of fat in the product.) A Zahn cup can be used to monitor the viscosity of the batter.

For example, a Stein Tempura batter applicator may be used to apply the emulsion batter. As they are designed for more viscous batters. The batter applicator is modified with upper and lower air knives and three scraper bars to insure an even distribution of batter coating on each food portion. The air knives and scraper bars on the batter applicator (and on the prewash applicator) enable equal amounts of batter (or prewash) to be removed from both the top and bottom of the fish portion. If too much emulsion (prewash) remains on the bottom, the product may be soggy. These tools also allow the prewash to be run very thick so that plenty of solids stay on the raw fish.

Breading

The batter coated fish is then coated with a first layer of breading 122 that will comprise 7% to 10% (preferably 8.64%) by weight of the finished breaded fish stick or fillet. A second layer of breading 124, is then applied over the first breading, comprising 3% to 5% (preferably 3.36%) by weight of the finished breaded fish stick or fillet. The breadings can be colored (e.g., caramel colored), flavored, seasoned, pretoasted, and sized as to particular shape and granulation. The crispness of the finished food product varies with the type of crumbs used for the breading. crisp, very crunchy crumbs are preferred. For the first layer of breading, the crumbs preferably are round and coarse with less than 5% moisture (such as Newly Weds #6524). For the second layer of breading, the crumbs preferably are spindly and fine crumb with less than 5% moisture (such as Newly Weds #6517). The so-called Japanese-style of breading can be used to augment the crisp, crunchy character of the breaded food. The breading should be colored to enhance the appearance of the finished food product.

The breading may be applied with any commercial breading unit 22, e.g., a Stein J-Breader which includes two blowers angled such that the breading crumbs are neither compressed down into the emulsion batter, nor blown off the surface of the food. The rollers must either be eliminated or checked to make sure their spring loaded mounting mechanisms are working effectively. This technique produces a crispness in the breading of the finished product when served. By contrast, compression of the crumbs into the emulsion batter would produce a soggy final product while excessive blowing would result in an insufficiently coated product.

For application of the second layer of breading, a second breading unit 24, e.g., a Stein J-Breader may be used which includes two blowers and a roller to insure an even distribution of breading on the surface of the food. The second breading layer fills the voids that remain after application of the first breading layer. In order to avoid dislodging or damaging the breaded coating, it is important to provide a mechanically smooth transfer to the sprayer.

Spray

The batter coated and breaded fish pieces are sprayed with a starch solution, which also helps to prevent the breading from falling off. It is the uniform coating of starch on the breading which holds the breading on. Recall that the breading is applied to the batter without compression and so would not necessarily stay together without the starch coating. This technique assures that the breading will not become soggy from having been pushed into the emulsion batter. The starch spray comprises 1% to 3% (preferably 1.5%) by weight of the finished breaded fish stick or fillet. The spray solution is preferably a solution of 8% to 15% (preferably 10%) tapioca dextrin, Crystal Gum (National Starch #52–2550). The starch solution can be prepared in any suitable mixing device. The mixer should contain a heater and recirculating pump such that the starch solution is heated to 150° F. before being pumped (via a filter) to a holding tank connected to a spraying device. The final starch spray is applied over the breading by a fine mist sprayer 26 to achieve a uniform and complete coating 130.

The purpose of the starch is to hold the crumb to the core food during processing, handling, and cooking of the coated food product.

Further Processing and Preparation for Serving

The finished coated product is frozen and packaged for distribution.

The frozen product is prepared for serving by baking in a conventional hot air oven for 20–30 minutes in a 375° F. oven. The heat cooks the uncooked fish and congeals the emulsion batter. Microwave preparation is possible but may not provide as much crispness.

Note that all of the equipment throughout the process is operated with extended noses and adjusted angles to assure smooth transfer of product from one belt to another, preventing the coating from being scraped off. If portions of the coating are scraped off the product may be soggy and may stick to the cooking pan.

Properties

The resulting breaded food is comprised of preferably about 51.5–54% Pollock, about 21.5% batter coating, about 12% breading, and about 11% undercoating by weight, and has the desirable characteristics of a breaded food while limiting fat and saturated fat to acceptable, health-oriented levels. Limiting the fat content also results in a lower calorie breaded food that is less fattening. The product may have, for example, less than 30% of its calories as fat and less than 1% of its fat as saturated fat.

The oven baked breaded food appears golden brown, has a uniform coating of breading with no bare spots, and appears crisp with no wet or fatty surface areas. The coating on the food has good adhesion and cohesion (imparted by the composition of the ingredients and the even application of each ingredient to the core food product) which are discernible during preparation of the breaded foods for serving and in handling or prodding with a fork.

The eating qualities of the breaded food of the invention are similar to a deep fried food, i.e. crisp and crunchy, although not as greasy. The food is moist and tender, but not soggy or doughy. Since the core food is not precooked, a fresher taste is achieved when the frozen product is cooked.

Other embodiments are within the following claims. The breading system is applicable to core foods other than fish, for example, meat, seafood, poultry, and vegetables. It is especially effective for foods with high water content.

We claim:

1. A method for producing a cooked low-fat breaded food product ready for eating comprising:

providing an uncooked food;

making a frozen, uncooked, breaded food product by
prewashing the uncooked food,
predusting the prewashed food with fine breading crumbs,
coating the predusted food with an emulsion of oil and water, said emulsion comprising proportions of oil such that the low-fat uncooked breaded food product comprises at least 3% and no more than 8% by weight of fat,
applying to the coated food a first breading layer comprising coarse crumbs,
applying to the once breaded food a second breading layer comprising fine crumbs, spraying the twice breaded food with a dextrin-based solution, and freezing the sprayed food; and cooking the frozen, uncooked, breaded food product in an oven converting such uncooked product into a comestible.

2. A method for converting an uncooked food product into a comestible comprising providing an uncooked core food, applying a breaded coating system of bread crumbs and a fat-emulsion batter to the uncooked core food, the batter comprising from 13% to 30% fat such that the amount of fat in the uncooked core food is at least 3% and no more than 8% by weight, cooking the coated uncooked core food, without prefrying and having fat of at least 3% and no more than 8% by weight in an oven for conversion into the comestible.

3. The method of claim 2 including spraying starch over the bread coating system prior to cooking.

4. The method of claim 3 wherein applying the breaded coating system includes providing as the fat-emulsion batter a mixture comprising fat, water, emulsifier and stabilizer.

5. The method recited in claim 4 wherein applying the bread coating system includes providing as an emulsifier, egg white.

6. The method recited in claim 5 wherein applying the bread coating system includes providing as the stabilizer, water soluble gum.

7. The method recited in claim 6 wherein applying the bread coating system includes providing as the fat, canola oil.

* * * * *